United States Patent [19]
Cuscurida et al.
[11] Patent Number: 4,525,488
[45] Date of Patent: Jun. 25, 1985

[54] PREPARATION OF POLYADDITION PRODUCTS OF MANNICH CONDENSATES AND POLYISOCYANATES IN POLYOLS AND THEIR USE IN POLYURETHANES

[75] Inventors: Michael Cuscurida; George P. Speranza, both of Austin, Tex.

[73] Assignee: Texaco Inc., White Plains, N.Y.

[21] Appl. No.: 650,383

[22] Filed: Sep. 13, 1984

[51] Int. Cl.$^3$ .............................................. C08G 18/14

[52] U.S. Cl. .................................... 521/164; 252/308; 521/167; 524/721; 524/762; 528/76

[58] Field of Search ................ 524/721, 762; 252/308; 528/76; 521/164, 167

[56] References Cited

U.S. PATENT DOCUMENTS

| | | | |
|---|---|---|---|
| 3,297,597 | 1/1967 | Edwards et al. | 521/164 |
| 4,137,265 | 1/1979 | Edwards et al. | 521/167 |
| 4,296,213 | 10/1981 | Cuscurida et al. | 521/166 |

*Primary Examiner*—Maurice J. Welsh
*Attorney, Agent, or Firm*—Jack H. Park; David L. Mossman; Richard A. Morgan

[57] ABSTRACT

A stable dispersion of polyaddition products (also called polyurethane polymer polyols) may be made by reacting a Mannich condensate with an organic polyisocyanate in a polyether polyol. The Mannich condensate is made by reacting a phenol with an alkanolamine and formaldehyde and should not be subsequently water-stripped or alkoxylated. If the Mannich condensate has its water content removed, the ultimate dispersion will be unstable and will phase separate. These dispersions are useful in the production of polyurethane foams.

18 Claims, No Drawings

PREPARATION OF POLYADDITION PRODUCTS OF MANNICH CONDENSATES AND POLYISOCYANATES IN POLYOLS AND THEIR USE IN POLYURETHANES

CROSS-REFERENCE TO RELATED APPLICATION

This application is related to U.S. patent application Ser. No. 457,823 filed on Jan. 13, 1983, now abandoned, which relates to polyurethane polymer polyols made with alkoxylated aromatic nitrogen-containing polyols and polyurethanes therefrom.

BACKGROUND OF THE INVENTION

1. Field of the Invention

The invention pertains to the field of polyurethane plastics and more particularly relates to polyurethane plastics made using polyurethane polymer polyols.

2. Description of Related Compositions

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2,000 to 3,000 and above. These polyols are then reacted with polyisocyanate in the presence of water or other blowing agents such as fluorocarbons to obtain polyurethane foams. Polyols have been modified in many ways in attempts to improve the properties of the resulting polyurethane.

For example, elastomeric polytetramethylene ether polyurethane polymers may be made from reactions involving a polymethylene ether glycol having a molecular weight of at least 750, an organic diisocyanate and a chain extender containing active hydrogen according to U.S. Pat. No. 2,929,800. The glycol may be added to the diisocyanate to form a prepolymer.

U.S. Pat. No. 3,294,751 relates to the preparation of polyurethanes via a modified polyol called a ureido-polyol. These low molecular weight ureido-polyols are formed by the reaction of an organic compound consisting of a hydrocarbon group having less than 10 carbon atoms and at least one isocyanate group and an alkanolamine. Further, the invention disclosed in U.S. Pat. No. 4,118,376 concerns a hydrocurable composition suitable for use as coatings, adhesives or grouts. The composition contains oxazolidine compounds and free isocyanate groups containing prepolymers where the prepolymers are obtained by the reaction of polyisocyanates with special types of dispersions where the dispersed phase is synthesized in situ in a dispersing media of polyhydroxyl compounds.

Other prior art describes modified polyols in which vinyl monomers such as styrene or acrylonitrile or other materials such as hydrazine hydrate have been included to improve the properties of the resulting foam. However, some of these prior art materials are highly toxic and require, in addition, stripping of unreacted toxic vinyl monomers or water of hydration. U.S. Pat. No. 4,107,102 describes the manufacture of polyurethane foam using a polyol containing hydrazine and its adducts.

German Offenlegungsschrift No. 2,110,055 discloses a process for making a polyurethane product whereby a hydroxyl-containing amine is included in the formulation in a one-shot process. That is, the hydroxyl-containing amine is simply included initially with the polyol and the polyisocyanate and a polyurethane product results. The German process does not use a polyurea polymer polyol which is then reacted with a polyisocyanate.

U.S. Pat. No. 3,325,421 discloses the method of making a stable dispersion of a urea in a composition comprising an organic polyisocyanate, a diamine and a compound having at least two alcoholic hydroxyl groups.

A polymer-modified polyol may be formed by polymerizing an alkanolamine with an organic polyisocyanate in the presence of a polyol as taught by U.S. Pat. No. 4,374,209. The alkanolamine may react polyfunctionally with the polyisocyanate to produce polyaddition products which may constitute a stable dispersion in the polyol. The resulting modified polyol is stated to be particularly useful as a polyol starting material for reaction with a polyisocyanate in the manufacture of polyurethane foam. This patent also mentions that it may be possible to use other olamine compounds which have hydroxyl and amine groups attached to carbocyclic, aromatic or heterocyclic nuclei or combinations thereof.

Stable dispersions are also revealed in U.S. Pat. No. 4,089,835. Here, the stable dispersions comprise polyureas and/or polyhydrazo-dicarbonamides as the disperse phase in a hydroxyl group-containing material selected from the group of polyethers, polyesters, polyester amides and polycarbonates. These dispersions may be produced by reacting organic polyisocyanates with polyamines containing primary and/or secondary amino groups and/or hydrazines and/or hydrazides in the hydroxyl-containing material.

U.S. Pat. No. 4,296,213 relates to polyurea polymer polyols made by the reaction of a hydroxyl-containing amine, a polyether polyol of about 3,000 to 8,000 molecular weight and an organic polyisocyanate. The hydroxyl-containing amines contemplated therein are described as ranging in molecular weight from about 60 to 200, preferably from about 60 to about 150.

Also relevant are two patents concerning the production of nitrogen-containing polyols, U.S. Pat. Nos. 3,297,597 and 4,137,265. Although these patents disclose Mannich condensates somewhat similar to those found useful in the instant invention, they require further steps after the Mannich condensate reaction such as water stripping and subsequent alkoxylation not desired in the instant invention.

SUMMARY OF THE INVENTION

The invention concerns a stable dispersion of polyaddition products made by reacting a Mannich condensate with an organic polyisocyanate in a polyether polyol. The Mannich condensate is made by reacting a phenol with an alkanolamine and formaldehyde in the absence of subsequent water removal and the absence of subsequent alkylene oxide addition.

DESCRIPTION OF THE PREFERRED EMBODIMENTS

The stable dispersions of polyaddition products of this invention, which may also be called polyurethane polymer polyols, are made by the reaction of a Mannich condensate which has not been subjected to water stripping (water removal) or alkoxylation, with an organic polyisocyanate and a polyether polyol. While these materials are sometimes referred to in the singular as a polyaddition product dispersion or a polyurethane polymer polyol, it must be remembered that the ultimate reaction product actually contains a mixture of slightly different polyaddition products or polymer polyols.

Generally, the procedure for making the Mannich condensate begins by mixing a phenol and an alkanolamine which is selected from the group of alkanolamines having the formulae:

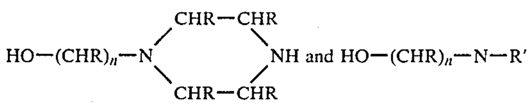

where R is selected from the group consisting of hydrogen and lower alkyl of one to four carbon atoms, R′ is selected from the group consisting of hydrogen, lower alkyl of one to four carbon atoms and —$(CHR)_n$—OH and n is a positive integer having a value of two to five. Subsequently, formaldehyde is added and the mixture is slowly heated with agitation to a temperature of at least 50° C., such as between about 80°–150° C. for a period of time sufficient to reduce the formaldehyde content. In this invention, water is not stripped off to produce the Mannich condensate. Any water present remains with the Mannich condensate product. It will be shown that if the water is removed, an unstable dispersion will result which will phase-separate. The Mannich condensate is further unlike commercial aromatic nitrogen-containing polyols in that the condensate is not further reacted with any alkylene oxide.

The phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500.

Examples of acceptable phenolic compounds include phenol itself ($C_6H_5OH$), o—, m—, or p-cresols, ethylphenol, nonylphenol, p-phenylphenol, 2,2-bis(4-hydroxyphenyl)propane, β-naphthol, β-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-(2-hydroxypropyl)phenol, 2-(4-hydroxyphenol)ethanol, 2-carbethoxyphenol and 4-chloromethylphenol. Especially preferred are phenol itself and nonylphenol.

The alkanolamine to be reacted with the phenolic compound and formaldehyde in accordance with the present invention has already been defined with the structural formula set out above. Examples of suitable alkanolamines that may be used are monoethanolamine, diethanolamine, isopropanolamine, bis(2-hydroxypropyl)amine, hydroxyethylmethylamine, N-hydroxyethylpiperazine, N-hydroxybutylamine, N-hydroxyethyl-2,5-dimethylpiperazine, and the like. Diethanolamine is especially preferred.

Formaldehyde may be employed in the Mannich reaction in any of its conventional forms, such as an aqueous formalin solution, an "inhibited" methanol solution, paraformaldehyde or trioxane.

It is also preferred that the mole ratio of phenol:alkanolamine:formaldehyde be from about 1:1:1 to 1:2:1.

The polyether polyol which is used as the dispersing medium in this invention has a hydroxyl number preferably between about 20 and 60. The polyol is generally an alkylene oxide adduct of a polyhydric alcohol, preferably a trihydric alcohol, with a functionality of from about 2 to about 4. The alkylene oxide may suitably be ethylene oxide, propylene oxide, or 1,2-butylene oxide or a mixture of some or all of these. The polyol will preferably have a molecular weight within the range of from about 2,000 to about 10,000 and more preferably, from about 3,000 to about 8,000. The alkylene oxide is preferably propylene oxide or a mixture of propylene oxide and ethylene oxide. This definition does not contemplate polyether polyols which contain aromatic or amine groups.

The ratio of moles of Mannich condensate to moles of polyether glycols should range from about 0.5 to 3.5, and preferably from about 0.7 to 2.8.

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4′-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4′-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Since the stable dispersion of polyaddition products has by definition free hydroxyl groups, the amount of polyisocyanate used to form the polyurethane polymer polyol is less than the stoichiometric amount needed to satisfy the active hydrogens of the hydroxyl groups of the polyether polyol and the Mannich condensate and the active amine hydrogens. Therefore, the ratio of moles of hydroxyl groups (from both the polyether polyol and nitrogen-containing polyol) to moles of isocyanate groups should range from about 1.0 to 3.0. It is preferred that this ratio be from about 1:1 to 2:1. Preferably, the hydroxyl number range of these stable dispersions should range from about 30 to about 75.

It should be noted that the polymer polyols of this invention are quite different from the quasi-prepolymers made for rigid foam uses described in U.S. Pat. Nos. 3,297,597 and 4,137,265. In those patents, the quasi-prepolymer is formed by reacting a large molar excess of isocyanate with polyol in contrast to the excess of polyol to isocyanate contemplated herein. In addition, the Mannich condensates therein are water-stripped and alkoxylated unlike those herein.

The polyether polyol, Mannich condensate and polyisocyanate can be successfully reacted without application of external heat and at atmospheric pressure although higher temperatures and pressures would also be acceptable. The reaction temperature could range between 25° and 100° C. The pressure could range from atmospheric to 100 psig. The Mannich condensate may be made separately from the polyether polyol or in situ therewith as demonstrated by Example 5.

The polyurethane polymer polyol or dispersion of polyaddition products prepared from the above ingredients is then incorporated into a formulation which results in a polyurethane product. The polyurethane polymer polyol may be used in conjunction with a polyisocyanate such as those mentioned above or may be combined with additional polyol, such as those mentioned above and others, and reacted with a polyisocyanate to form a resulting polyurethane foam product.

The advantage of the foam-forming method of my invention using the polyurethane polymer polyols described herein is that flexible urethane foams can be produced which are firmer and stronger than similar products made using conventional polyols. These lower viscosity polymer polyols can be used at the same polymer loading. The polyurethane polymer polyols of this invention may also be blended with conventional polyols to enhance the properties of the resulting foams beyond that possible with the conventional polyols alone.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_{4'}$, $Sn(OR)_{4'}$, $Al(OR)_{3'}$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polyurethane polymer polyol and any additional polyol present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE 1

Step A—Preparation of Mannich Condensates

This example will illustrate the preparation of the Mannich condensate used in this invention. Phenol (4.14 lb., 20 moles) and diethanolamine (4.63 lb, 20 moles) were charged into a five-gallon kettle. Formaldehyde (as 37% formalin solution, 3.57 lb. 20 moles) was slowly added to the kettle with agitation while maintaining the reaction temperature about 25° C. After the formaldehyde addition was completed, the reaction mixture was stirred for one hour at 35° C. and then heated for one hour at 83° C. The reaction mixture was then cooled to about 25° C. and drained from the kettle. The product was a reddish brown, viscous liquid which had a water content of 24.6%.

Step B—Preparation of Polymer Polyol

Into a one-liter four-necked flask equipped with a stirrer, thermometer, dropping funnel, water condenser, and nitrogen source were charged 450 g of a 5,000 molecular weight high reactivity glycerine-based triol (THANOL ®SF-5505; Texaco Chemical Co.) and 38.5 g of the Mannich condensate from Step A above. The polyol-Mannich condensate mixture was then heated to 49° C. and 21 g toluene diisocyanate added dropwise over a 25 minute period. The reaction mixture was then heated an additional two hours at 50°-52° C. The finished product was an off-white viscous dispersion with the following properties.

| | |
|---|---|
| Total amine, meq/g | 0.26 |
| Hydroxyl number, mg KOH/g | 60 |
| Viscosity, 77° F., cps | 2960 |

EXAMPLE 2

This example will show that unstable products were formed when water was stripped from the Mannich condensate prior to reaction with the toluene diisocyanate.

Into a two-liter three-necked flask equipped with a stirrer, thermometer, dropping funnel, water condenser, and nitrogen source were charged 1350 g of THANOL SF-5505 and 115.5 g of the Mannich condensate from Step A of Example 1. The polyol-Mannich condensate mixture was then dewatered by vacuum stripping to a minimum pressure at 100° C. The mixture was then cooled to 50° C. Toluene diisocyanate (63 g) was then added dropwise over a 30 minute period. The reaction mixture was then heated at 40°-58° C. over a two hour period. The product phase-separated on cooling.

EXAMPLE 3

This example will demonstrate a scale-up preparation of the polymer polyol of Example 1.

Into a ten-gallon kettle were charged 36 lb. of THANOL SF-5505, 1.5 g of dibutyltin dilaurate and 3.12 lb of the Mannich condensate of Example 1. The reactor was then evacuated and purged with prepurified nitrogen. The reaction mixture was then heated to 50° C. Toluene diisocyanate (1.68 lb) was then added slowly over a 30 minute period. The reaction mixture was then heated at 50°-60° C. for three hours. Unreacted water in the product was removed by vacuum stripping at 90°-100° C. The finished product had the following properties.

| | |
|---|---|
| Total amine, meq/g | 0.25 |
| Hydroxyl number, mg/KOH/g | 59.2 |
| Water, wt. % | 0.01 |
| Viscosity, 77° F., cps | 2485 |

EXAMPLE 4

This example will illustrate the use of the polymer polyols of this invention in the preparation of flexible high resilience (HR) foam. It will also show the stabilizing effect of these polymer polyols in the preparation of HR foams from THANOL SF-5505 polyol and a 6,000 molecular weight HR foam polyol.

| Foam no. | A | B | C |
|---|---|---|---|
| Formulation, pbw | | | |
| THANOL SF-5505 | 60 | — | 100 |
| 6,000 molecular wt. HR polyol[1] | — | 60 | — |
| Polymer Polyol of Example 1 | 40 | 40 | — |
| Water | 4.1 | 4.1 | 4.1 |
| L-5309 silicone[2] | 2.0 | 2.0 | 2.0 |
| THANCAT ® TD-33[3] | 0.25 | 0.25 | 0.25 |
| NIAX ® A-1[4] | 0.25 | 0.25 | 0.25 |
| THANCAT DM-70[5] | 0.25 | 0.25 | 0.25 |
| UL-1[6] | 0.01 | 0.01 | 0.01 |
| 80:20 toluene diisocyanate/ MONDUR MR[7] | 51.8 | 51.1 | 50 |
| Isocyanate index | 1.02 | 1.02 | 1.02 |
| Details of Preparation | | | |
| Cream time, sec. | 10 | 10 | 10 |
| Rise time, sec. | 130 | 125 | 120 |
| Gel time, sec. | 225 | 210 | 210 |
| Properties | | | |
| Density, pcf | 1.81 | 1.81 | — |
| Tensile, psi | 11.6 | 12.9 | — |
| Tear, pli | 1.3 | 1.6 | — |
| Foam appearance | Good foam | Good foam | Foam shrunk badly |

[1]Hydroxyl number, mg KOH/g = 27.2
[2]Silicone surfactant made by Union Carbide Corp.
[3]33% triethylenediamine in propylene glycol made by Texaco Chemical Co.
[4]70% bis-dimethylaminoethylether in dipropylene glycol made by Union Carbide Chemical Corp.
[5]70% N,N'—dimethylpiperazine and 30% dimorpholinodiethyl ether made by Texaco Chemical Co.
[6]Organotin compound made by M & T Chemical Co.
[7]2.7 functionality polymeric isocyanate made by Mobay Chemical Co.

EXAMPLE 5

This example will illustrate the preparation of the Mannich condensate of this invention in the presence of the polyether polyol and the subsequent preparation of the polymer polyol by reaction with toluene diisocyanate.

Into a one-liter, three-necked flask equipped with a stirrer, thermometer, dropping funnel, water condenser, and nitrogen source were charged 450 g of THANOL ®SF-5505 polyol, 14.85 g diethanolmine, and 12.85 g phenol. After the reactants were thoroughly mixed, 10.8 g 37% formaldehyde was slowly added to the reaction flask. When the formaldehyde addition was completed, the reaction mixture was heated one hour at 30° C. and then at 80°-82° C. for an additional hour. The reaction mixture was then cooled to 23° C. and 21 g toluene diisocyanate added dropwise over a 15-minute period. It was then heated an additional two hours at 50°-55° C. The resultant product was an off-white, viscous dispersion which had the following properties:

| Properties | Run No. 5895-69 |
|---|---|
| Amine, meq/g | 0.04 |
| Hydroxyl No., mg KOH/g | 86 |
| Viscosity, 77° F., cps | 1944 |

Many modifications may be made in the methods and stable dispersions of polyaddition products (polyurethane polymer polyols) of this invention without departing from the spirit and scope thereof which are defined only in the appended claims. For example, one skilled in the art could probably devise a particular combination of reacting the Mannich condensate, polyisocyanate and polyether polyol to give a polymer dispersion with particularly advantageous properties.

We claim:

1. A stable dispersion of polyaddition products made by the reaction of a. a Mannich condensate made by reacting a phenol with an alkanolamine and formaldehyde, in the absence of subsequent water removal and the absence of subsequent alkylene oxide addition, and
b. an organic polyisocyanate in
c. a polyether polyol.

2. The stable dispersion of claim 1 in which the ratio of hydroxyl equivalents in the Mannich condensate to isocyanate equivalents in the organic polyisocyanate ranges from 1/1 to 2/1.

3. The stable dispersion of claim 1 in which the Mannich condensate is made by reacting phenol or nonylphenol with diethanolamine and formaldehyde.

4. The stable dispersion of claim 1 in which the mole ratio of phenol:alkanolamine:formaldehyde ranges from about 1:1:1 to 1:2:1.

5. The stable dispersion of claim 1 in which the polyether polyol has a molecular weight in the range of about 3,000 to 8,000.

6. The stable dispersion of claim 1 made at a temperature in the range of 25° to 100° C. and at a pressure from atmospheric to 100 psig.

7. A method for making a stable dispersion of polyaddition products comprising a. reacting a phenol with an alkanolamine and formaldehyde, in the absence of subsequent water removal and in the absence of subsequent alkylene oxide addition, to give a Mannich condensate, and
b. reacting the Mannich condensate with an organic polyisocyanate in a polyether polyol, to make a stable dispersion of polyaddition products.

8. The method of claim 7 in which the ratio of hydroxyl equivalents in the Mannich condensate to isocyanate equivalents in the organic polyisocyanate ranges from 1/1 to 2/1.

9. The method of claim 7 in which the phenol is selected from the group consisting of phenol itself and nonylphenol and the alkanolamine is diethanolamine.

10. The method of claim 7 in which the mole ratio of phenol:alkanolamine:formaldehyde ranges from about 1:1:1 to 1:2:1.

11. The method of claim 7 in which the polyether polyol has a molecular weight in the range of about 3,000 to 8,000.

12. The method of claim 7 performed at a temperature in the range of 25° to 100° C. and at a pressure from atmospheric to 100 psig.

13. A method for producing a polyurethane which comprises a. reacting a phenol with an alkanolamine and formaldehyde, in the absence of subsequent water removal and in the absence of subsequent alkylene oxide addition, to give a Mannich condensate,
b. reacting the Mannich condensate with an organic polyisocyanate in a polyether polyol to make a stable dispersion of polyaddition products, and
c. subsequently reacting the stable dispersion of polyaddition products with an organic polyisocyanate.

14. The method of claim 13 in which the ratio of hydroxyl equivalents in the Mannich condensate to isocyanate equivalents in the organic polyisocyanate ranges from 1/1 to 2/1.

15. The method of claim 13 in which the phenol is selected from the group consisting of phenol itself and nonylphenol and the alkanolamine is diethanolamine.

16. The method of claim 13 in which the mole ratio of phenol:alkanolamine:formaldehyde ranges from about 1:1:1 to 1:2:1.

17. The method of claim 13 in which the polyether polyol has a molecular weight in the range of about 3,000 to 8,000.

18. The method of claim 13 performed at a temperature in the range of 25° to 100° C. and at a pressure from atmospheric to 100 psig.

* * * * *